(12) United States Patent
Liu et al.

(10) Patent No.: US 8,430,594 B2
(45) Date of Patent: Apr. 30, 2013

(54) ELECTRONIC DEVICE AND ASSEMBLY STRUCTURE THEREOF

(75) Inventors: Tsung-Chin Liu, Taipei County (TW); Shen-Yuan Yu, Taipei County (TW); Chao-Hung Lin, Taipei County (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 1077 days.

(21) Appl. No.: 12/238,766

(22) Filed: Sep. 26, 2008

(65) Prior Publication Data
US 2009/0293656 A1 Dec. 3, 2009

(30) Foreign Application Priority Data

Jun. 2, 2008 (TW) .............................. 97120436 A

(51) Int. Cl.
*F16D 1/00* (2006.01)
(52) U.S. Cl.
USPC ................. 403/321; 361/679.23; 361/679.55; 348/373
(58) Field of Classification Search .................. 403/321, 403/322.1, 322.3; 361/679.23; 396/428; 348/374, 207.1
See application file for complete search history.

(56) References Cited

U.S. PATENT DOCUMENTS

| | | | | |
|---|---|---|---|---|
| 5,801,919 A * | 9/1998 | Griencewic | | 361/679.26 |
| 5,880,928 A * | 3/1999 | Ma | | 361/679.27 |
| 6,751,473 B1 * | 6/2004 | Goyal et al. | | 455/556.1 |
| 6,812,958 B1 * | 11/2004 | Silvester | | 348/207.1 |
| 6,933,981 B1 * | 8/2005 | Kishida et al. | | 348/375 |
| 7,256,987 B2 * | 8/2007 | Weng | | 361/679.55 |
| 7,435,018 B2 * | 10/2008 | Huang et al. | | 396/419 |
| 7,453,688 B2 * | 11/2008 | Wu et al. | | 361/679.55 |
| 7,563,040 B2 * | 7/2009 | Tsai et al. | | 396/428 |
| 7,677,815 B2 * | 3/2010 | Lane et al. | | 396/348 |
| 7,800,648 B2 * | 9/2010 | Lu et al. | | 348/207.1 |
| 7,894,850 B2 * | 2/2011 | Chen | | 455/550.1 |
| 2005/0168924 A1 * | 8/2005 | Wu et al. | | 361/683 |
| 2005/0201047 A1 * | 9/2005 | Krah | | 361/683 |
| 2006/0001743 A1 * | 1/2006 | Lee | | 348/207.1 |
| 2008/0012944 A1 * | 1/2008 | Lu et al. | | 348/207.1 |
| 2008/0143872 A1 * | 6/2008 | Lu et al. | | 348/374 |
| 2011/0050910 A1 * | 3/2011 | Fan | | 348/207.1 |

* cited by examiner

*Primary Examiner* — Michael P Ferguson
*Assistant Examiner* — Daniel Wiley
(74) *Attorney, Agent, or Firm* — McClure, Qualey & Rodack, LLP

(57) ABSTRACT

An electronic device includes a housing having a lens assembly and a feeding device. The lens assembly is movable between a first reference position and a second reference position with respect to the housing. The feeding device is coupled to the lens assembly. When the lens assembly is in the first reference position, the lens assembly is engaged with the housing. When the lens assembly is moved to the second reference position from the first reference position by the feeding device, the lens assembly situated in the second reference position is rotatable and movable.

9 Claims, 8 Drawing Sheets

ELECTRONIC DEVICE AND ASSEMBLY STRUCTURE THEREOF

CROSS REFERENCE TO RELATED APPLICATIONS

This Application claims priority of Taiwan Patent Application No. 97120436, filed on Jun. 2, 2008, the entirety of which is incorporated by reference herein.

BACKGROUND OF THE INVENTION

1. Field of the Invention

The present invention relates to an assembly structure, and in particular relates to an electronic device and an assembly structure thereof to provide a lens assembly with six degrees of freedom.

2. Description of the Related Art

With respect to an electronic device such as a monitor or laptop provided with a webcam, the webcam mainly comprises a seat securely fixed on an outer housing of the electronic device and a lens movably fixed on the seat. In general, the lens of the webcam probably provides one or two degrees of freedom (i.e., single or two rotation directions) for movement. However, the entire structure of the electronic device must be moved or rotated to obtain a best video angle and a viewable angle, thus, resulting in operational inconveniences.

BRIEF SUMMARY OF THE INVENTION

In view of the operational inconveniences of the conventional devices, the invention provides an assembly structure. The assembly structure comprises a first member, a second member and a feeding device. The second member is moved between a first reference position and a second reference position with respect to the first member. The feeding device is connected to the second member. When the second member is in the first reference position, the second member is engaged with the first member. When the second member is fed to the second reference position from the first reference position by the feeding device, the second member situated in the second reference position is rotatable and movable.

The feeding device comprises a first flexible member connected to the lens assembly and a second flexible member connected to the first flexible member. The first flexible member is a wire material, and the second flexible member is a spring.

The assembly structure can further comprise a limitation device detachably connected to the second member. When the second member is limited by the limitation device, the second member is located at the first reference position. When the second member is not limited by the limitation device, the second member located at the first reference position is moved to the second reference position by the feeding device. The limitation device comprises an engaging portion moved between a first predetermined position and a second predetermined position, the second member is engaged with the first member by the engaging portion of the limitation device when the engaging portion of the limitation device is located at the first predetermined position, and the second member is separated from the first member by the engaging portion of the limitation device when the engaging portion of the limitation device is located at the second predetermined position.

Additionally, an electronic device is further provided. The electronic device comprises a housing, a lens assembly and a feeding device. The lens assembly is moved between a first reference position and a second reference position with respect to the housing. The feeding device is connected to the lens assembly. When the lens assembly is in the first reference position, the lens assembly is engaged with the housing. When the lens assembly is fed to the second reference position from the first reference position by the feeding device, the lens assembly situated in the second reference position is provided with movement and rotation.

The feeding device comprises a first flexible member connected to the lens assembly and a second flexible member connected to the first flexible member. The first flexible member is a wire material, and the second flexible member is a spring.

The electronic device can further comprise a limitation device detachably connected to the lens assembly. When the lens assembly is limited by the limitation device, the lens assembly is located at the first reference position. When the second member is not limited by the limitation device, the second member located at the first reference position is moved to the second reference position by the feeding device. The limitation device comprises a switch and an engaging portion connected to the switch and moved between a first predetermined position and a second predetermined position by the switch, the lens assembly is engaged with the housing by the engaging portion of the limitation device when the engaging portion of the limitation device is located at the first predetermined position, and the lens assembly is separated from the housing by the engaging portion of the limitation device when the engaging portion of the limitation device is located at the second predetermined position.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
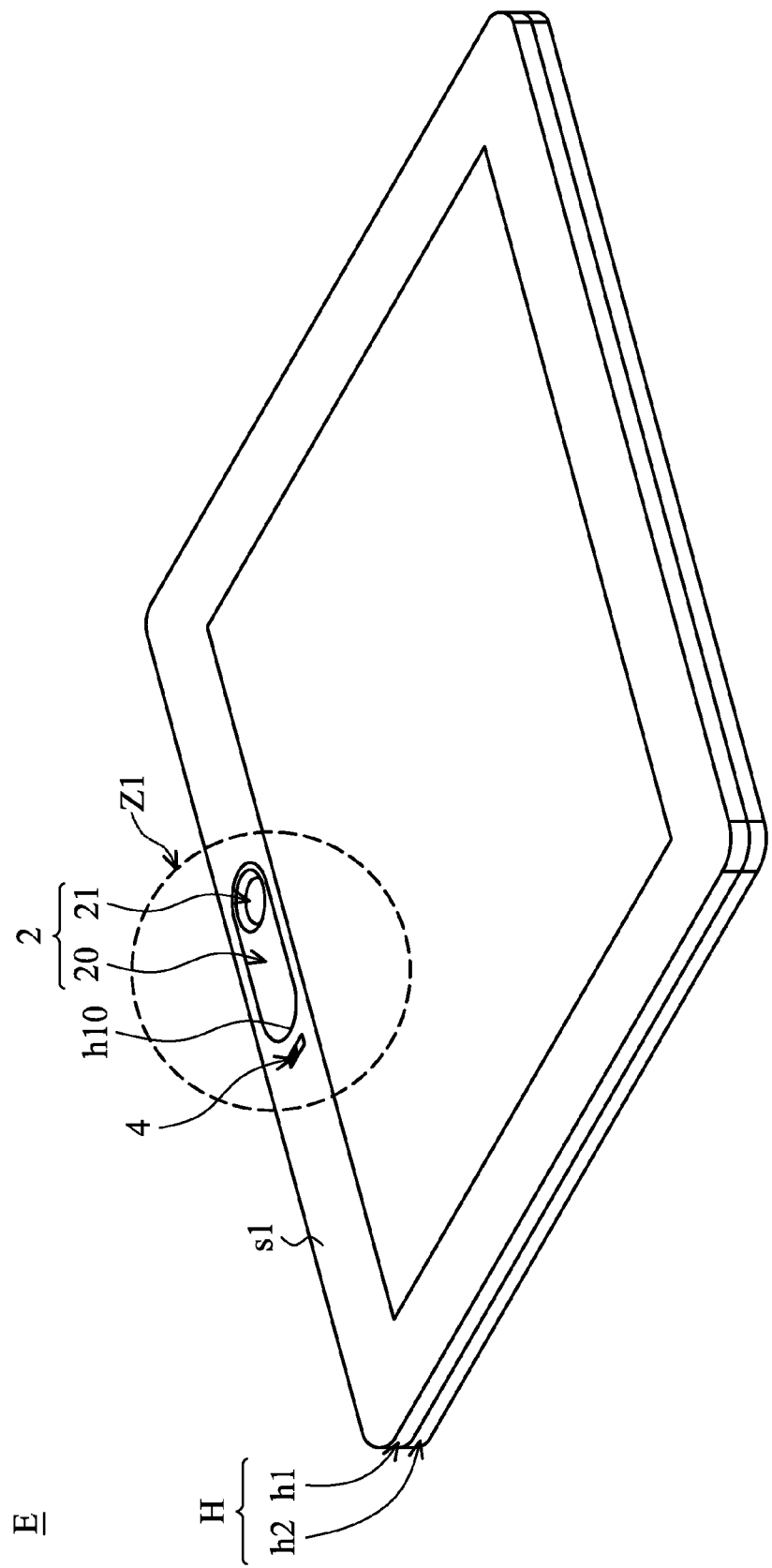
FIG. 1A is a perspective view of an electronic device of the invention when a lens assembly is at a first reference position.
Figure 1B:
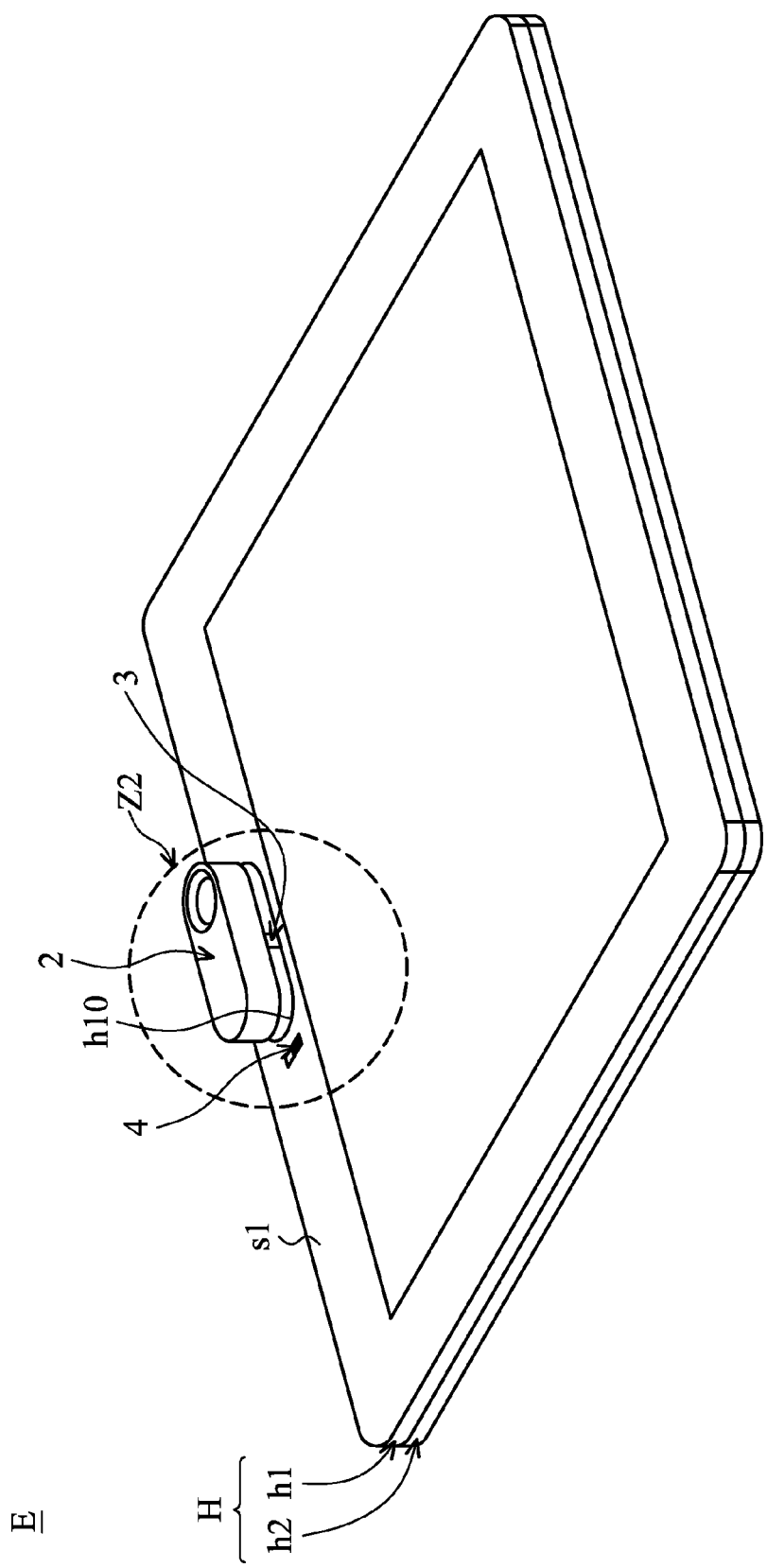
FIG. 1B is another perspective view of an electronic device of the invention when the lens assembly is at a second reference position.
Figure 2A:
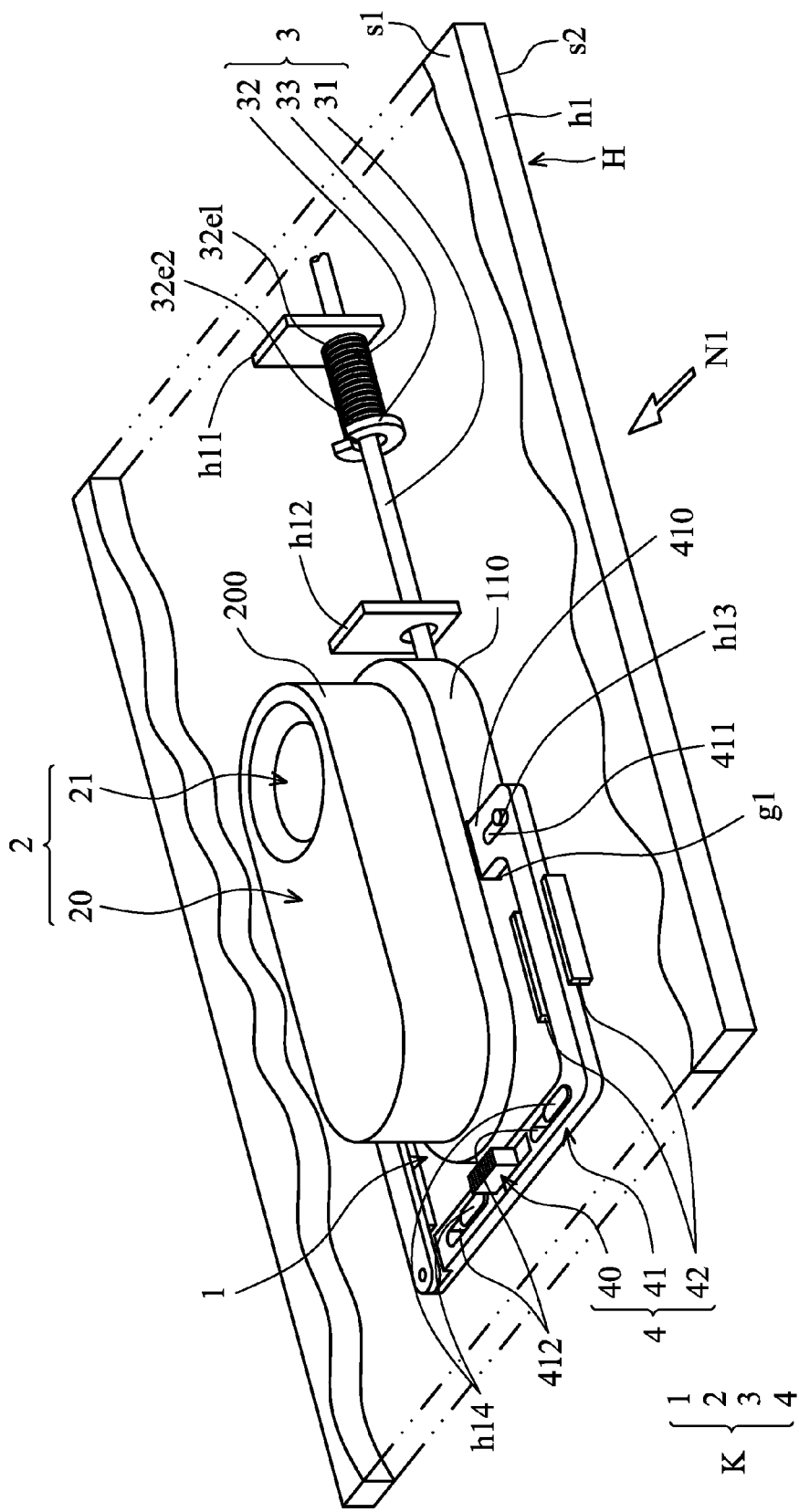
FIG. 2A is a schematic view of an inner structure of the electronic device located within a region (Z1) of FIG. 1A, wherein an engage portion is at a first predetermined position.
Figure 2B:
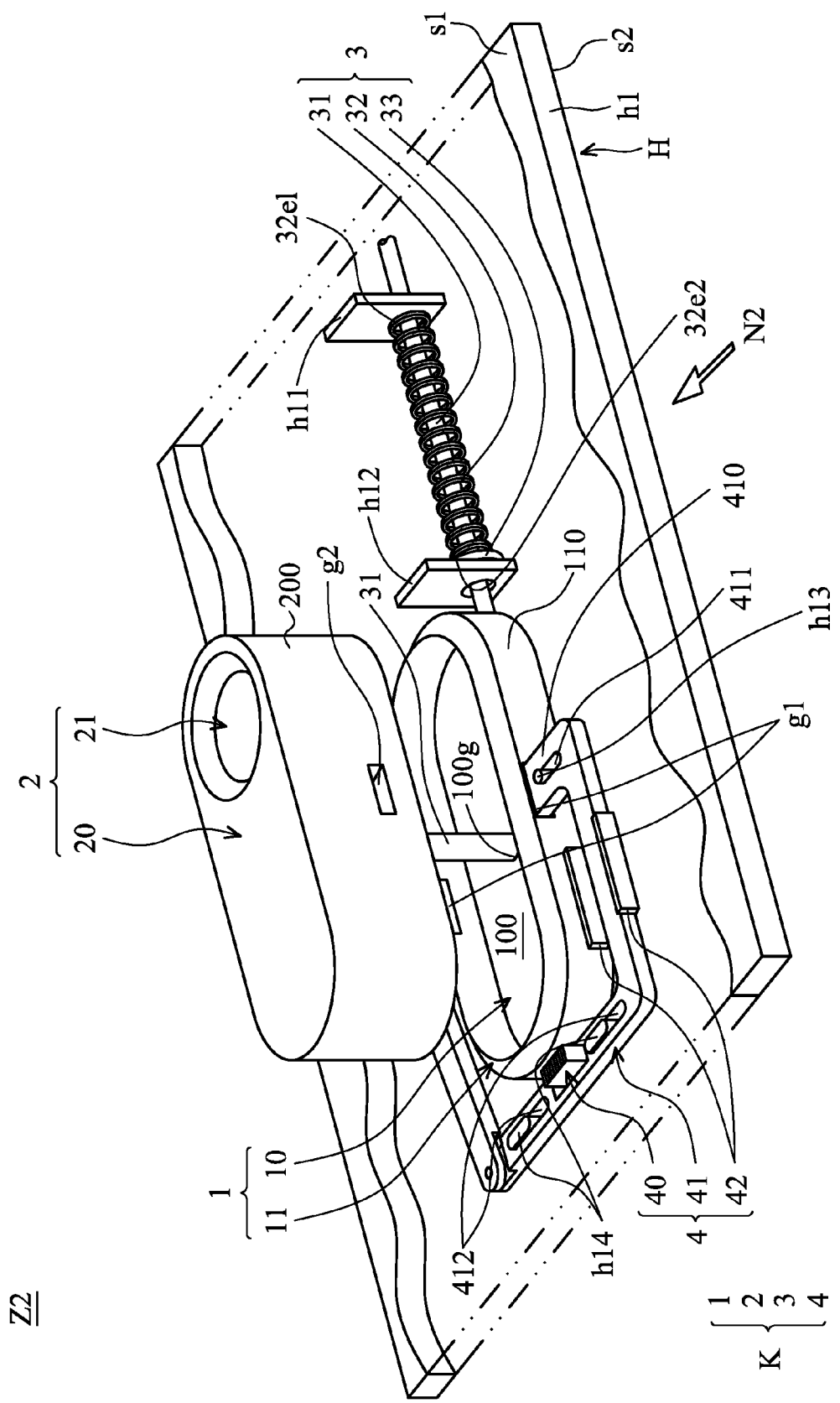
FIG. 2B is a schematic view of an inner structure of the electronic device located within a region (Z2) of FIG. 1B, wherein the engage portion is at a second predetermined position.
Figure 3A:
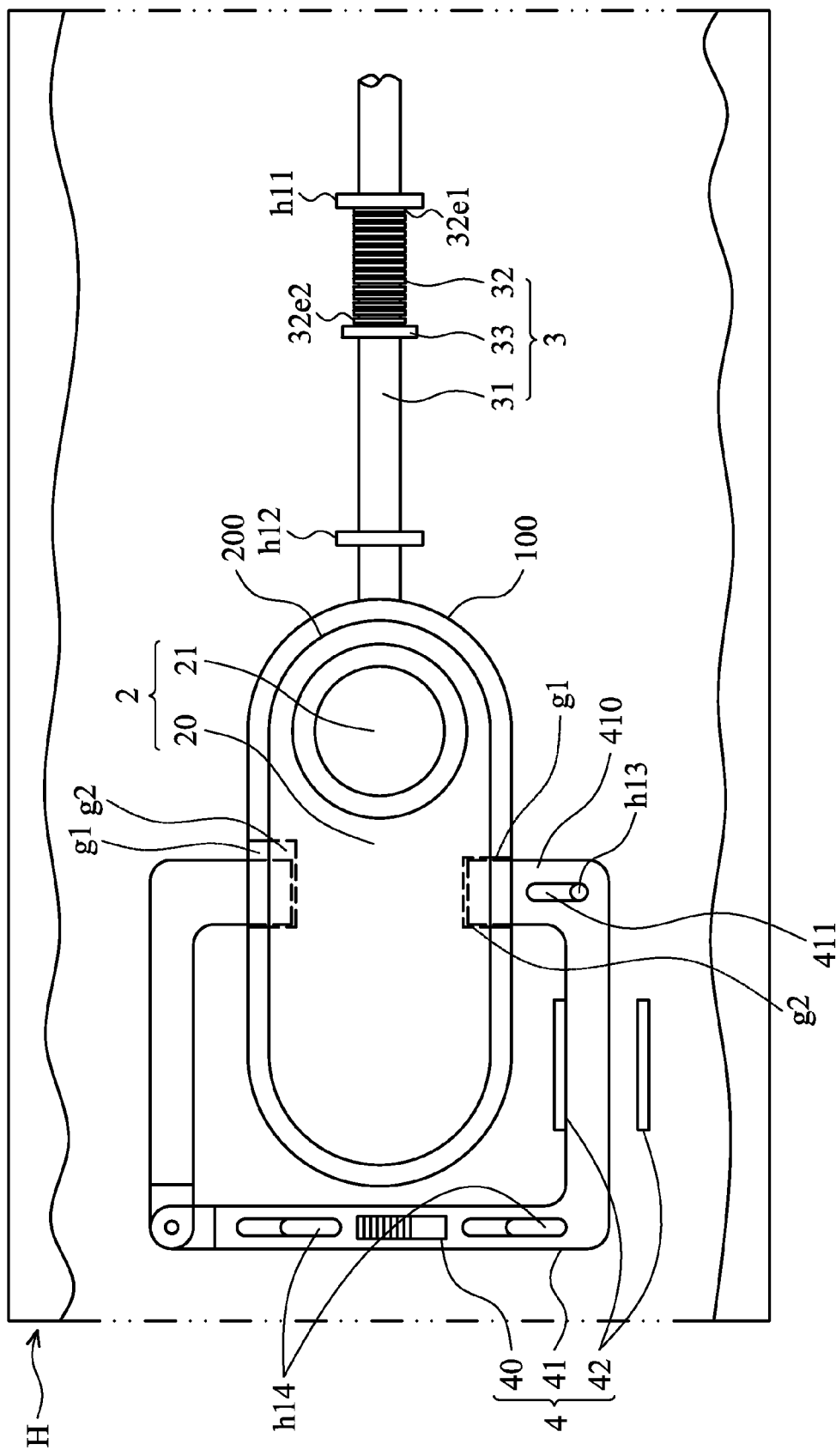
FIG. 3A is a top view of the electronic device of FIG. 2A.
Figure 3B:
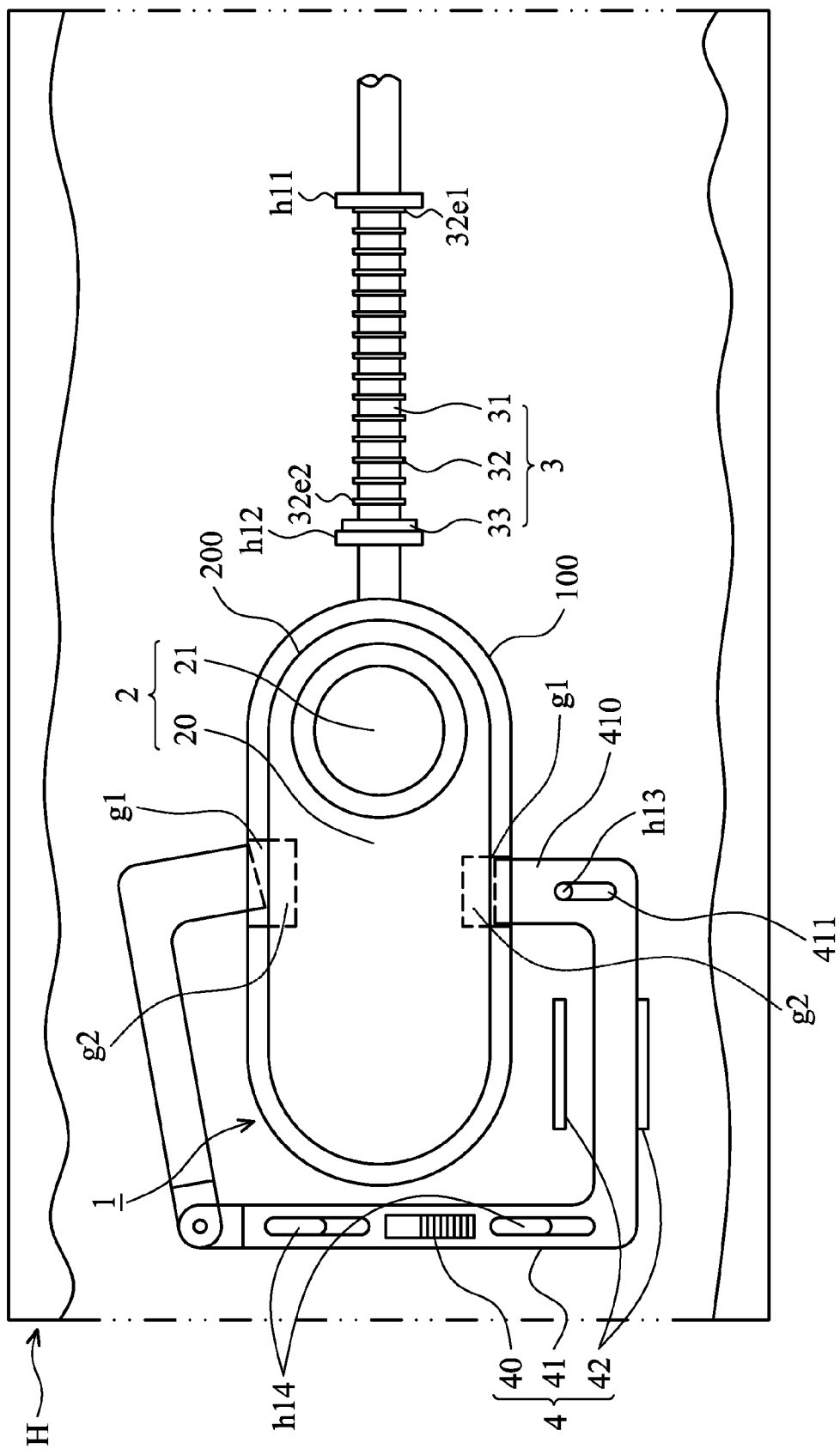
FIG. 3B is a top view of the electronic device of FIG. 2B.
Figure 4A:
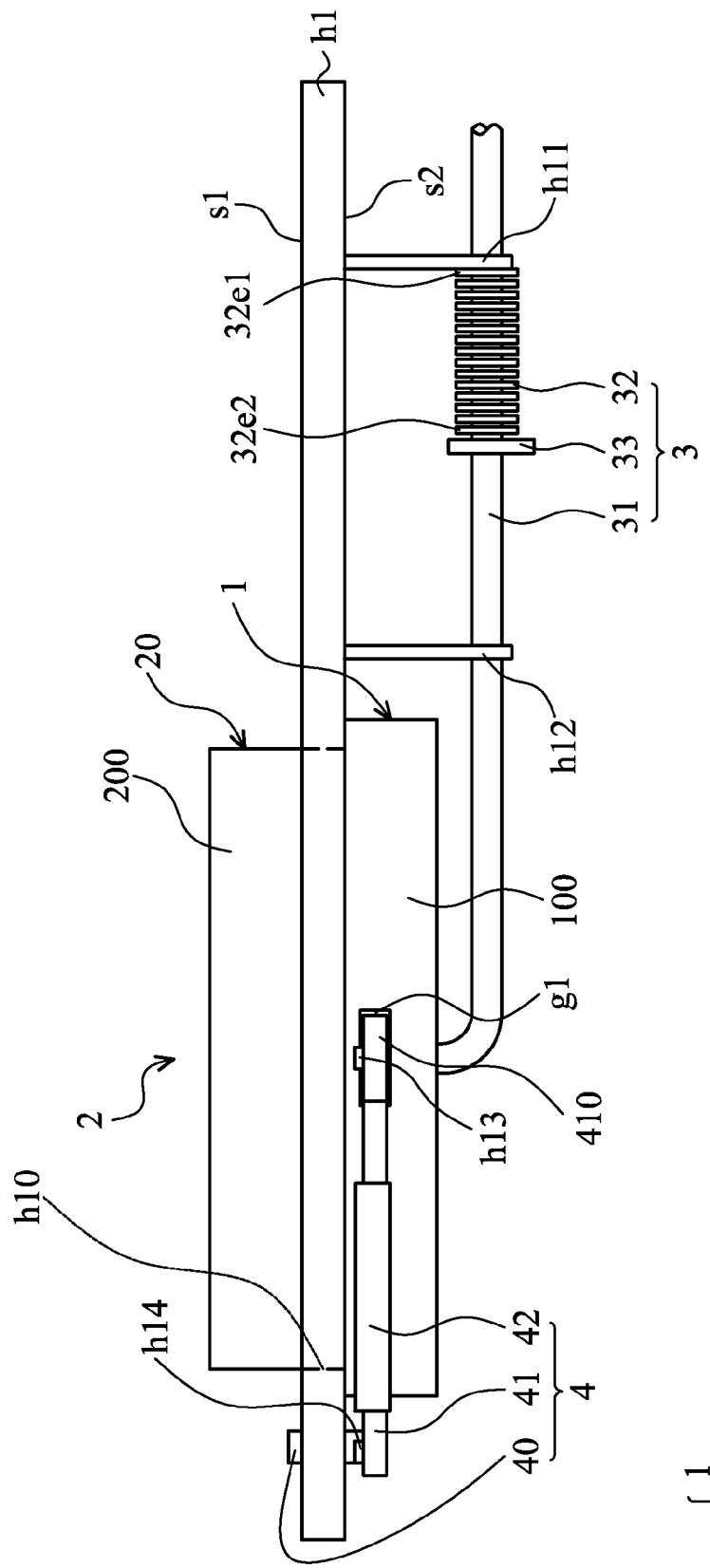
FIG. 4A is a plan view of the electronic device observed along a direction (N1) in FIG. 2A.
Figure 4B:
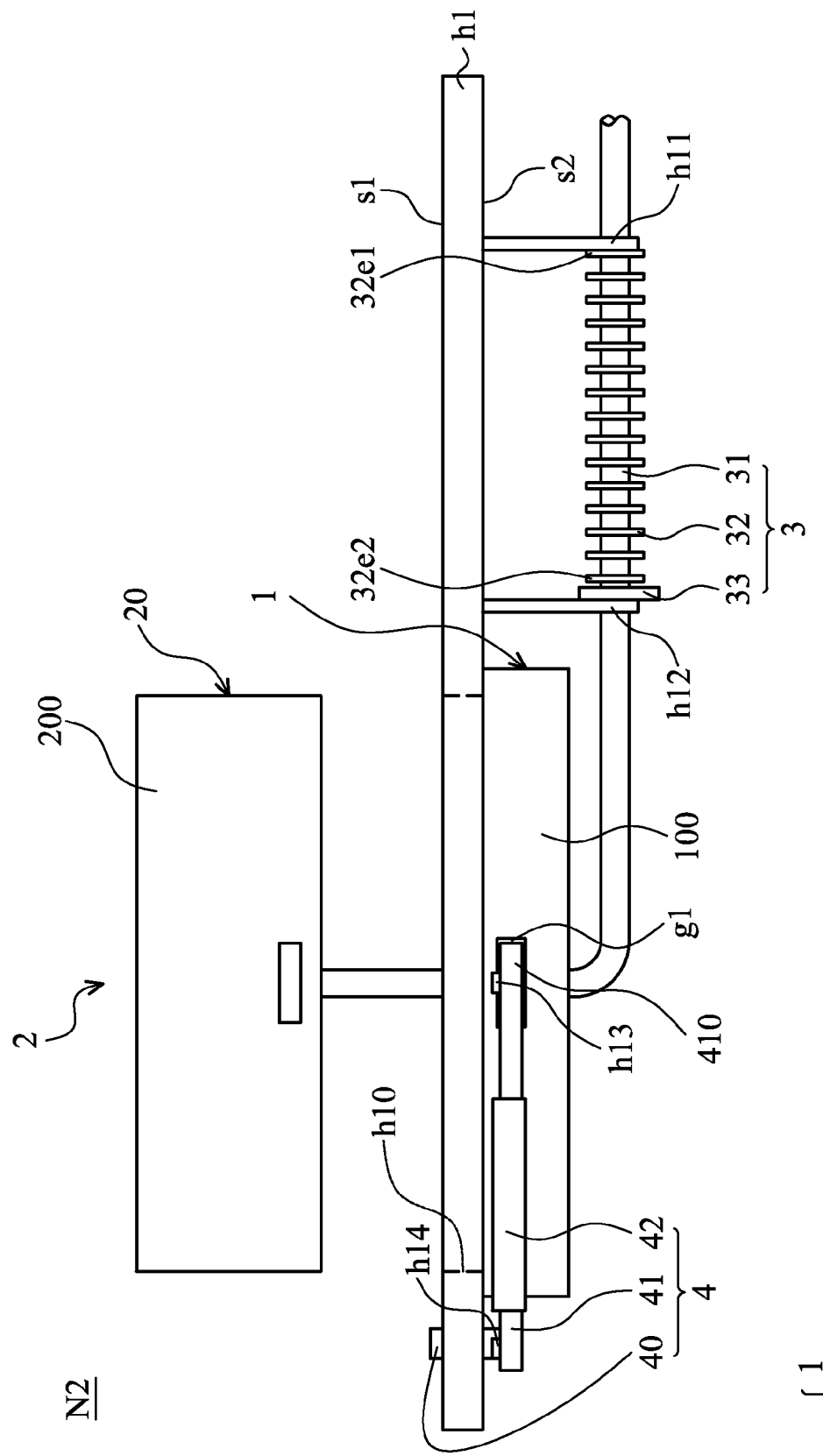
FIG. 4B is a plan view of the electronic device observed along a direction (N1) of FIG. 2B.

FIGS. 1A and 1B are perspective views of an electronic device E of the embodiment. FIGS. 2A and 2B are schematic views of an inner structure of the electronic device E located within regions Z1 and Z2 of FIGS. 1A and 1B, respectively. FIGS. 3A and 3B are top views of the electronic device E of FIGS. 2A and 2B, respectively. FIGS. 4A and 4B are plan views of the electronic device E observed along directions N1 and N2 of FIGS. 2A and 2B, respectively. In this embodiment, the electronic device E is a display.

In FIGS. 1A, 1B, 2A and 2B, the electronic device E comprises a housing H and an assembly structure K disposed on the housing H. The housing H comprises a base plate h1 and a bottom plate h2. The base plate h1 and the bottom plate h2 are integrally formed as an outer structure of the housing H. A guiding hole h10 is formed on the base plate h1. The assembly structure K comprises a first member 1 (see FIG. 2A), a second member 2, a feeding device 3 and a limitation device 4. The second member 2 is capable of being moved and positioned between a first reference position and a second reference position with respect to the first member 1 by the feeding device 3 and the limitation device 4. In this embodiment, the first member 1 is a seat, and the second member 2 is a lens assembly. To simply depict the relationship of these components, the seat 1 represents the first member, and the lens assembly 2 represents the second member.

In FIGS. 2A, 2B, 4A and 4B, the base plate h1 comprises an outer surface s1, an inner surface s2, a first auxiliary part h11, a second auxiliary part h12, a third auxiliary part h13 and a fourth auxiliary part h14. The first, second, third and fourth auxiliary parts h11, h12, h13 and h14 disposed on the inner surface s2 are utilized to guide the limitation device 4 simultaneously. In this embodiment, the first and second auxiliary parts h11 and h12 are two spaced plate-like protrusions extending from the inner surface s2, the third auxiliary part h13 is a cylindrical protrusion extending from the inner surface s2, and the fourth auxiliary part h14 comprises two spaced elliptically cylindrical protrusions extending from the inner surface s2.

The seat 1 disposed between the base plate h1 and the bottom plate h2 of the housing H comprises an accommodation portion 10 and a sidewall structure 11, wherein the accommodation portion 10 is formed in the sidewall structure 11. The accommodation portion 10 comprises a bottom surface 100 and a first guiding portion 100g formed on the bottom surface 100. The sidewall structure 11 comprises two second guiding portions g1 connected to the accommodation portion 10. In this embodiment, the seat 1 is a hollow protrusion integrally formed on the housing H, wherein the accommodation portion 10 is a recess formed in the sidewall structure 11. The sidewall structure 11 is a circular sidewall structure encircling the accommodation portion 10, the first guiding portion 100g is a through hole penetrating the bottom surface 100, and two second guiding portions g1 are two respective through holes penetrating the sidewall structure 11.

The lens assembly 2 comprises a body 20 and a lens 21 disposed on the body 20. The body 20 of the lens assembly 2 detachably disposed on the accommodation portion 10 of the housing H is capable of moving along the guiding hole h10 of the base plate h1 of the housing H (see FIG. 1A). Two corresponding positioning portions g2 formed on the outer surface 200 of the body 20 of the lens assembly 2 are corresponding to the two second guiding portions g1 of the sidewall structure 11 of the housing H, respectively. When the body 20 of the lens assembly 2 is disposed in the accommodation portion 10 of the housing H, the two corresponding positioning portions g2 formed on the outer surface 200 of the body 20 of the lens assembly 2 are connected to the two second guiding portions g1 of the sidewall structure 11 of the seat 1, and the lens 21 of the lens assembly 2 is exposed by the outer surface s1 of the base plate h1. The lens assembly 2 is capable of moving between the first reference position (shown in FIG. 2A) and the second reference position (shown in FIG. 2B) with respect to the housing H.

The feeding device 3 comprises a first flexible member 31, a second flexible member 32 and a fastener 33. The first flexible member 31, which is guided and limited by the first and second auxiliary parts h11 and h12 of the housing H and the first guiding portion 100g of the accommodation portion 10, is connected to one side of the body 20 of the lens assembly 2 of the seat 1. The second flexible member 32 comprises two end portions 32e1 and 32e2, wherein the end portion 32e1 is directly connected to the first auxiliary part h11 of the housing H, and the end portion 32e2 is connected to the first flexible member 31 by the fastener 33. Because the fastener 33 located between the first and second auxiliary parts h11 and h12 of the housing H is positioned on the first flexible member 31, the movable range of the second flexible member 32 is limited between the first and second auxiliary parts h11 and h12 of the housing H. In this embodiment, the first flexible member 31 is made of a wire material (only partially shown in length) which is provided with six degrees of freedom to freely move (rotation and translation), the second flexible member 32 is a spring, and the fastener 33 is a C-shaped fastener capable of fastening on the first flexible member 31. In FIG. 2A, the second flexible member 32 is situated in a compression state; meanwhile, the lens assembly 2 is located at the first reference position. In FIG. 2B, the second flexible member 32 is situated in a released state. Meanwhile, the lens assembly 2 is located at the second reference position.

The limitation device 4 detachably connected to the lens assembly 2 comprises a switch 40, a linkage assembly 41 and a block 42. The linkage assembly 41 is a movable element disposed in the housing H, and the switch 40 drives the linkage assembly 41 to move with respect the housing H. The linkage assembly 41 comprises a plurality of coupled bars containing an engaging portion 410, a first slotted structure 411 and two second slotted structure 412. The third auxiliary part h13 and the fourth auxiliary part h14 of the base plate h1 are fitted in the first slotted structure 411 and the second slotted structure 412 of the linkage assembly 41, respectively, thereby guiding and limiting the first slotted structure 411 and the second slotted structure 412 of the linkage assembly 41 by the third auxiliary part h13 and the fourth auxiliary part h14 of the base plate h1. The switch 40 drives the linkage assembly 41, thereby moving the engaging portion 410 of the linkage assembly 41 between a first predetermined position (shown in FIG. 2A) and a second predetermined position (shown in FIG. 2B).

In FIGS. 2A and 3A, when the engaging portion 410 of the limitation device 4 is located at the first predetermined position, the engaging portions 410 of the limitation device 4 are inserted to the positioning portions g2 of the body 20 of the lens assembly 2 via the second guiding portions g1 of the sidewall structure 11 of the seat 1, so that the lens assembly 2 is securely engaged with the seat 1 of the housing H. When the engaging portion 410 of the limitation device 4 located at the first predetermined position is moved toward the second predetermined position, the engaging portion 410 of the limitation device 4 is sequentially separated from the second guiding portions g1 of the sidewall structure 11 of the seat 1 and the positioning portions g2 of the body 20 of the lens assembly 2.

In FIGS. 2B and 3B, when the linkage assembly 41 of the limitation device 4 is limited by the block 42 to cause the engaging portion 410 to be engaged at the second predetermined position, the engaging portion 410 of the limitation device 4 is completely separated from the second guiding portions g1 of the sidewall structure 11 of the seat 1 and the positioning portions g2 of the body 20 of the lens assembly 2. Because the sidewall structure 11 of the seat 1 and the body 20 of the lens assembly 2 are situated in a non-connection state, the second flexible member 32 situated in the compression state can be released. With an elastic force being exerted from the second flexible member 32 to move the first flexible member 31 and the fastener 33 being limitedly blocked by the second auxiliary part h12 of the base plate h1, the lens assembly 2 can be moved from the first reference position to the second reference position.

When the lens assembly 2 is moved to the second reference position, the lens assembly 2 directed by the first flexible member 31 is provided with six degrees of freedom or can be freely rotated and translated. Without rotating or moving the entire structure of the electronic device E, therefore, a best video angle and a viewable angle can be achieved by the operation of the lens assembly 2 located at the second reference position.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An assembly structure, comprising:
   a base plate comprising first and second tabs protruding from the base plate, the first tab comprising a first tab hole, and the second tab comprising a second tab hole substantially aligned with the first tab hole;
   a housing protruding from the base plate and comprising a sidewall portion enclosing an inner space, the housing further comprising a feed aperture formed in a bottom portion of the inner space, and first and second locking apertures formed on opposing sections of the sidewall portion;
   an assembly adapted to fit into the inner space of the housing, the assembly comprising a locking notch on each of two opposing sides thereof, the locking notches each configured to align with a respective one of the first and second locking apertures of the housing;
   a locking device configured to insert through the aligned locking apertures and locking notches; and
   a feeding device connected to the assembly and configured to move the assembly with respect to the housing, wherein the feeding device comprises:
      a flexible wire comprising a first end and an opposing second end wherein the first end passes through the aligned first and second tab holes, and the second end passes through the feed aperture in the bottom portion of the housing and connects to the assembly;
      a fastener rigidly connected to the flexible wire between the first and second tabs; and
      a spring substantially surrounding the flexible wire, the spring comprising a first end and an opposing second end, wherein the first end is connected to the first tab and the second end is connected to the fastener;
   wherein the feeding device is adapted to move the assembly between a locked position and an unlocked position, whereby:
      in the locked position, the assembly is seated within the inner space of the housing such that each of the locking notches of the assembly are aligned with a respective one of the first and second locking apertures in the housing; the locking device is inserted through the aligned locking apertures and locking notches; and the fastener is moved toward the first tab of the base plate, thereby compressing the spring; and
      in the unlocked position, the locking device is removed from the locking notches and locking apertures; the spring is uncompressed such that the fastener abuts the second tab of the base plate; and the first end of the flexible wire extends outwardly from the feed aperture in the housing, such that the assembly is movable and rotatable with respect to the housing.

2. The assembly structure as claimed in claim 1, wherein the base plate further comprises a side peg formed outside the inner space of the housing and adjacent the first locking aperture, and at least one rear peg formed outside the inner space opposite the first and second tabs.

3. The assembly structure as claimed in claim 2, wherein the locking device comprises a switch, the switch comprising a first slotted structure slidingly engaged with the at least one rear peg, and a second slotted structure connected to the first slotted structure and slidingly engaged with the side peg, the second slotted structure further comprising an engaging portion, whereby sliding the first and second slotted structures along the rear and side pegs, respectively, moves the engaging portion into and out of the first locking aperture.

4. The assembly structure as claimed in claim 3, wherein the housing comprises a seat, and the assembly comprises a lens assembly.

5. An electronic device, comprising:
   a base plate comprising first and second tabs protruding from the base plate, the first tab comprising a first tab hole, and the second tab comprising a second tab hole substantially aligned with the first tab hole;
   a housing protruding from the base plate and comprising a sidewall portion enclosing an inner space, the housing further comprising a feed aperture formed in a bottom portion of the inner space, and first and second locking apertures formed on opposing sections of the sidewall portion;
   a lens assembly adapted to fit into the inner space of the housing and comprising a locking notch on each of two opposing sides thereof, the locking notches each configured to align with a respective one of the first and second locking apertures of the housing;
   a locking device configured to insert through the aligned locking apertures and locking notches; and
   a feeding device connected to the lens assembly and configured to move the lens assembly with respect to the housing, wherein the feeding device comprises:
      a flexible wire comprising a first end and an opposing second end wherein the first end passes through the aligned first and second tab holes, and the second end passes through the feed aperture in the bottom portion of the housing and connects to the lens assembly;
      a fastener rigidly connected to the flexible wire between the first and second tabs; and
      a spring substantially surrounding the flexible wire, the spring comprising a first end and an opposing second end, wherein the first end is connected to the first tab and the second end is connected to the fastener;
   wherein the feeding device is adapted to move the lens assembly between a locked position and an unlocked position, whereby:

in the locked position, the lens assembly is seated within the inner space of the housing such that each of the locking notches of the lens assembly are aligned with a respective one of the first and second locking apertures in the housing; the locking device is inserted through the aligned locking apertures and locking notches; and the fastener is moved toward the first tab of the base plate, thereby compressing the spring; and in the unlocked position, the locking device is removed from the locking notches and locking apertures; the spring is uncompressed such that the fastener abuts the second tab of the base plate; and the first end of the flexible wire extends outwardly from the feed aperture in the housing, such that the lens assembly is movable and rotatable with respect to the housing.

6. The electronic device as claimed in claim 5, wherein the base plate further comprises a side peg formed outside the inner space of the housing and adjacent the first locking aperture, and at least one rear peg formed outside the inner space opposite the first and second tabs.

7. The electronic device as claimed in claim 6, wherein the locking device comprises a switch, the switch comprising a first slotted structure slidingly engaged with the at least one rear peg, and a second slotted structure connected to the first slotted structure and slidingly engaged with the side peg, the second slotted structure further comprising an engaging portion, whereby sliding the first and second slotted structures along the rear and side pegs, respectively, moves the engaging portion into and out of the first locking aperture.

8. The electronic device as claimed in claim 7, wherein the electronic device comprises a display.

9. The electronic device as claimed in claim 5, wherein the electronic device comprises a display.

* * * * *